United States Patent Office 3,525,616
Patented Aug. 25, 1970

3,525,616
LIGHT SENSITIVE COMBINATION OF A HALOGEN HYDROCARBON, A LEUCO TRIARYL METHANE DYE AND AN N-VINYLCARBAZOLE
Ernst-August Hackmann and Johannes Munder, Wiesbaden-Biebrich, Germany, assignors to Kalle Aktiengesellschaft, Wiesbaden-Biebrich, Germany, a corporation of Germany
No Drawing. Filed Dec. 9, 1965, Ser. No. 512,774
Claims priority, application Germany, Dec. 10, 1964, K 54,765; Sept. 1, 1965, K 57,012
Int. Cl. G03c 1/72
U.S. Cl. 96—36    9 Claims

ABSTRACT OF THE DISCLOSURE

Negative-working reproduction material of particularly high light sensitivity and distinct image formation is provided with the combination of a light-sensitive halogen hydrocarbon source of free radicals, a leuco triarylmethane dye and an N-vinylcarbazole.

---

The present invention relates to new, negative-working reproduction materials of high light-sensitivity.

Reproduction materials have been described which contain leuco triarylmethane dyes which in the presence of certain halogen hydrocarbons change into visible dyes when exposed to light. Additional materials have been described which contain N-vinylcarbazoles which when combined with certain halogen hydrocarbons may be exposed to light image-wise, such as by means of a transparency or the like, and will produce a latent image which may be made visible by means of certain special developing processes. The light-sensitivity and the image quality achievable with these previous materials, as for example image sharpness and contrast, are relatively low. Furthermore, in the case of material consisting of the N-vinylcarbazole and the halogen hydrocarbon the image becomes visible only after a developing step, such as by heating.

It is an object of the present invention to produce a reproduction material of improved light-sensitivity which yields better image quality and by means of which a visible image may be obtained when exposure to light is effected.

A further object of the invention is a reproduction material of improved sensitivity which may be readily fixed after image formation. Yet another object is a reproduction material which provides a simple means for producing high quality printing plates and the like. Other objects of the invention will become apparent as this description proceeds.

The material of the present invention may be generally described as a light-sensitive material comprising a suitable support, for example, paper, metal or plastic films, and a light-sensitive coating thereon, said coating comprising at least one leuco triaryl methane dye, at least one N-vinyl carbazole, and at least one halogen hydrocarbon which splits off halogen when exposed to light. Various binder materials may be employed in the coating composition to improve coatability, texture, etc.

As examples of suitable leuco triaryl methane dyes there may be mentioned:

[(CH$_3$)$_2$NC$_6$H$_4$]$_3$CH—leuco crystal violet
[(CH$_3$)$_2$NC$_6$H$_4$]$_2$—CH—C$_6$H$_5$—leuco malachite green
[NH$_2$—C$_6$H$_4$]$_2$—C—C$_6$H$_3$(CH$_3$)—NH fuchsine base
[NH$_2$—C$_6$H$_4$]$_3$CH—leuco pararosaniline Useful halogen hydrocarbons in the coating of the present invention may be those which split off halogen when exposed to light. In particular, halogen hydrocarbons of the general formula:

may be used, wherein X may stand for chlorine, bromine and iodine, and R, R$_1$ and R$_2$ may be the same or different and stand for chlorine, bromine, iodine, hydrogen and alkyl (which may be optionally substituted by chlorine, bromine or iodine), aryl, aralkyl, alkenyl or a heterocyclic group.

In addition, polyhalogenated heterocyclic 5-membered rings, such as pyrroletetraiodide, carboxylic acid chlorides and derivatives thereof, and halogenated plastics, for example, chlorinated rubber, may also be used.

As individual representatives of the halogen hydrocarbons to be used according to the invention, the following are named: pentabromoethane, hexachloroethane, ω,ω,ω-tribromoacetophenone, benzotrichloride, cyanuric chloride, iodoform, bromoform and hexachlorocyclohexane.

Particularly good results are yielded by: tetrabromomethane, 4 - bromo-ω,ω,ω-tribromoacetophenone, 2,4-dimethyl-ω,ω,ω-tribromoacetophenone and 3-nitro-ω,ω,ω-tribromoacetophenone.

As vinylcarbazoles, besides N-vinylcarbazole itself, its alkyl derivatives, for example, 3,6-dimethyl-N-vinylcarbazole, are noted in particular.

In order to prepare the reproduction material according to the present invention, a solution is prepared with a suitable solvent and includes one or more leuco triarylmethane dyes, one or more halogen hydrocarbons, at least one N-vinylcarbazole and, if desired, a binder material as will be later described. An effective amount of the solution is applied by any of a number of various coating methods, the preference of the manufacturer being determinative, to a suitable support and the solvent is removed by evaporation means.

A suitable support for the coating of the present invention may be selected from many materials including wood, glass, plastic film, metal foil, textiles and in particular cellulose derivatives, such as, for example, cellulose triacetate and paper.

To achieve better shelf life of the unexposed reproduction materials, one of the active components of the light-sensitive coating, for example the halogen hydrocarbon, may be added shortly before exposure. Pre-exposure application might be practically accomplished by contact with the gaseous form of the hydrocarbon.

The fixing of the exposed materials is effected by washing with a nonpolar organic solvent in order to remove the halogen compound and the unreacted leuco triarylmethane dye. It is then advisable to pass the exposed material quickly through a weak alkaline solution, whereby air oxidation of residual leuco triarylmethane dye is prevented. The two washing processes, rather than being carried out separately, may be combined if a basic-reacting organic substance is added to the organic solvent. Such basic-reacting organic substances may include amines, such as triethylamine and pyridine.

When thermostable leuco triarylmethane dyes and readily-volatile halogen compounds are used, the fixing of the exposed materials may also be effected by heating briefly to 80°–120° C., for example in a drying cabinet, with the aid of heated plates or an infrared source, or by passing them over a heated roller. Such heating may then be followed either by the two washing processes or by an alkaline washing only. Thermal fixing, however, can only be used in isolated cases, since when heated, most leuco triarylmethane dyes react with halogen hydrocarbons to form colored dyes. Due to this heat-initiated dye formation heavy background colors will be formed and will substantially reduce the quality of the copies obtained or make them completely unusable. When proper thermostable leuco triarylmethane dyes are used, however, a slight color intensification of the copy image may be achieved.

As generally noted above, binder materials may be employed in the sensitizing composition to give suitable adherence of coatings, such as where the selected support is a smooth-surfaced material, for example, plastic film, glass, hard papers and the like. Suitable binder materials may include synthetic resins, natural resins and waxes, such as polystyrene, carboxymethyl cellulose, colophony, shellac, beeswax or carnauba wax.

A further, particularly advantageous fixing method consists in using binder materials which are soluble in water and in aqueous alkaline solution as well as in organic solvents. Such preferred binder materials include solid higher polyglycols, polyvinyl alcohol, poly-N-vinyl pyrrolidone, acid phenol resins, and polyacrylic amides. With the exception of the phenol resins, these resins may be removed from the layer by means of water. The phenol resins must be washed away with an aqueous alkaline solution. Although not necessary, such aqueous alkaline solutions may be used to wash a material including the other binders. When polyacrylic amides are used it should be noted that these materials become water-insoluble under the action of higher temperatures.

Many suitable organic solvents for preparing the coating solution are available and particularly useful are chlorinated hydrocarbons and acetone, since the light-sensitive components of the layer dissolve easily in these solvents. One or more binder materials may be contained in a layer and the amount of binder in the layer may vary within wide limits. The amount of binders used will depend to some degree upon the type of binder material employed. Some binders, such as poly-N-vinyl pyrrolidone, may be present in the layer in quantities ranging from 2 to 20% by weight based on the weight of the layer. Other binders may be added at even wider ranges or within widely varying ranges. Preparation of the coating from a solution makes possible a molecular dispersion of the light-sensitive components with the result that high light-sensitivity of the layer is achieved. Although the light-sensitivity of the material has been found to decrease slightly by the addition of water-soluble binders, this disadvantage is more than compensated by the advantage that the material can be easily fixed with water.

It is often advantageous to add wetting agents to the layer in order to facilitate the removal of the unexposed layer parts. Quantities ranging from 0.1 to 1% by weight, based upon the weight of the whole layer, are sufficient for this purpose. Cationic as well as anionic wetting agents may be used. Good results are obtained with commercial wetting agents such as Triton X100 (isooctyl phenyl polyethoxy ethanol).

Depending on the kind of vinyl compound used, an appropriate quantity of a polymerization inhibitor may be added to the solution prepared for the production of the light-sensitive layer in order that a premature polymerization of the vinyl compound is avoided. The inhibiting effect of the substance added must not, however, be such that polymerization during exposure is prevented. The amount of inhibiter may vary within wide limits. Generally, it will be sufficient to add 0.0001% to 3% by weight of inhibiter, preferably 0.001% to 1% by weight, based on the weight of the layer.

The following compounds have proved suitable as polymerization inhibiters: aromatic hydroxyl compounds, such as phenol, hydroquinone, pyrocatechol, pyrogallol, dihydro-resorcinol, and amino phenols, such as o-and p-aminophenol and p-dimethyl aminophenol.

Fixing of the exposed materials containing a binder that is soluble in water, aqueous alkaline solutions and organic solvents is performed by contacting such materials with any one of these solvents, for instance by immersion of by wiping over the layer with a wet sponge. A preferred fixing method includes the use of a device provided with rollers whereby the layer side of the exposed reproduction material is contacted by a roller carrying a thin layer of water or other appropriate solvent material, such as an aqueous alkaline solution.

During the fixing process it is not only the binder in the unexposed areas which is removed, but also the light-sensitive component distributed in these areas. The exposed areas are not attacked by water or other washing medium, because in these areas the monomeric-N-vinylcarbazole has turned into poly-N-vinylcarbazole. The polymer layer thus formed contains inclusions of the dyestuffs formed during exposure along with residual unreacted halogen hydrocarbons and may, in some cases, also contain residual unpolymerized mono-N-vinylcarbazole. It is assumed that the binder is in part polymerized in the polymer, in part surrounded by it. In any case, no binder is removed from the exposed areas by washing. These areas are no longer hydrophilic, but hydrophobic. The polymeric compound formed by the action of light is so resistant to abrasion that the image areas may be used for printing without further treatment.

Reproduction materials produced according to the present invention are particularly suitable for use in preparing plates for printing. They are preferably used as offset printing plates; however, etched plates may also be produced with the materials described, since the polymeric compounds are resistant to etching. If the material is used for offset printing, the support upon which the coating is applied should have a hydrophilic surface, since as stated above, the polymeric compound produced by the action of light is hydrophobic and thus accepts greasy ink. The exposed areas of a coated sheet are the printing areas, while the unexposed, wash-out areas accept water and are nonprinting. Suitable supports in the preparation of offset plates can be any sheet-like materials normally used for this purpose, for example precoated papers, plastic films, and aluminum foils.

If etched printing plates are to be produced from the reproduction material according to the invention, zinc or magnesium plates are preferred as supports. The common bi- or tri-metal plates, copper plates, and plates of copper/plastic laminate may also be used, however.

If directly readable copies are to be produced from the reproduction material according to the invention, the use of paper supports is recommended. The requirement to be met by the paper is that at least its layer side should be resistant to solvent from which the layer is to be applied. Further, it must be waterproof, at least on its layer side, because the unexposed areas of the layer will be removed after exposure for the most part by a washing with water or aqueous solution. A certain degree of stiffness to facilitate processing by roller application is also desirable. It has been found useful in the preparation of a suitable support media to provide one or more base coatings with materials such as polyvinyl chloride, polyacrylic acid and polymethacrylic acid esters, polystyrene, polyvinylidene chloride, phthalate and maleinate resins, and their copolymers. These materials are sufficiently resistant to water to give suitable protection to paper or other support materials which might be affected thereby.

In some instances it may be desirable to over-coat a support having a waterproof precoat layer with a resin that is readily soluble in water. When the exposed material is washed with water or aqueous solution during a fixing step, the light-sensitive layer which has not hardened by polymerization due to exposure to light is removed from the unexposed areas. In this manner, slightly reacted background discolorations may readily be removed to give clear, clean, and high contrast image reproductions. Poly-N-vinyl pyrrolidone is a material particularly suited to this purpose.

In some cases, it is desirable to produce transparent copies, for example when they are to be used for the preparation of further copies by contact exposure. For this purpose, a transparent support should be used and may include glass or any similar medium. Films of cellulose acetate which may be superficially saponified are preferred. If dimensionally stable transparent copies are required, polyethylene terphthalate films are preferably used.

Processing of the reproduction material according to the invention is simple and can be easily understood from what has been described above. The reproduction material may be exposed to light by contact, direct, or reflex processes. Suitable light sources for exposure may be conventional mixed light or ultraviolet radiators, or the ordinary incandescent bulb. Also, by means of projection equipment enlargements may readily be made on the reproduction material from microfilm originals.

Heating of the reproduction material after exposure is not necessary, as previously noted; however, exposure is normally immediately followed by a fixing process. Fixing usually takes place in the dark or at least in a weekly-lighted area under the incidence of light of the longest possible wave length. Fixation normally takes about 30 seconds and the final imaged material may be dried by air at normal temperatures or by means of a hot air blower.

Compared with known materials, the reproduction material according to the present invention has the advantage of substantially higher light-sensitivity and that it can be fixed with water when water-soluble binders are used. Further, the material according to the invention need not be heated for developing the image. Moreover, the light-stability of copies prepared with the material according to the invention is significantly increased over that previously obtainable with copy material consisting substantially of leuco triaryl methane dye and a halogen hydrocarbon alone.

The invention will be more specifically illustrated by the following examples:

Example 1

A base paper commonly used in photocopying processes was soaked with a solution of 0.1 g. of leuco crystal violet, 1.0 g. of tetrabromomethane and 1.0 g. of N-vinyl carbazole in 10 ml. of acetone. After evaporation of the solvent a re-enlargement of a silver film negative in the scale 1:10 was made on the thus prepared reproduction material with a 500-watt projector. The exposure time was five seconds. A distinctly visible blue image on a light background was obtained. The image was fixed to substantial light-insensivity by being washed with petroleum ether, rinsed briefly with 0.5% caustic soda solution, and dried.

By way of counter example:

Example 1B

The same base paper as that described in Example 1 was soaked with a solution of 1.0 g. of N-vinylcarbazole and 1.0 g. of tetrabromomethane in 10 ml. of acetone, and dried. The material which was colorless after an exposure of 30 seconds was heated to 100° C. for three minutes in a drying cabinet and a pale-yellow/light-brown image appeared.

Further counter example:

Example 1C

The same base paper as that in Examples 1 and 1B was soaked with a solution of 0.1 g. of leuco crystal violet and 1.0 g. of tetrabromomethane in 10 ml. of acetone. After drying, exposure was effected for 30 seconds in the same manner as described under Example 1. Only a very pale-blue image could be discerned. Fixation by washing with petroleum ether and rinsing with 0.5% solution of caustic soda did not improve the image.

Example 2

A base paper commonly used in photocopying processes was soaked with a solution of 0.1 g. of leuco malachite green, 1.0 g. of tetrabromomethane and 1.0 g. of N-vinylcarbazole in 10 ml. of acetone. After evaporation of the solvent, a reenlargement of a silver-film negative in the scale of 1:10 was made on the thus-prepared reproduction material with a 500-watt projector. The exposure time was 30 seconds. After exposure a distinct green image on a light background was obtained. Effective fixation was obtained as in Example 1 by washing with petroleum ether and rinsing briefly with 0.5% solution of caustic soda and drying the final copy.

By way of counter example:

Example 2B

The same base paper as in Example 2 was soaked with a solution of 0.1 g. of leuco malachite green and 1.0 g. of tetrabromomethane in 10 ml. of acetone and dried. After an exposure time of 60 seconds and otherwise the same method of handling as described in Example 2, only an extremely pale-green image was obtained.

Example 3

A baryta paper was coated to an effective thickness with a solution of 0.1 g. of leuco crystal violet, 1.0 g. of tetrabromomethane, and 1.0 g. of N-vinylcarbazole in 10 ml. of a 3% solution of polystyrene in acetone. With the reproduction material obtained, a 10× enlargement was produced from a silver-film negative by exposing it for five seconds to a 500-watt projector. The exposed material was washed with petroleum ether, rinsed with a 0.5% solution of caustic soda, and dried. A permanent blue image on a colorless background was obtained.

The same result was obtained when the polystyrene component was replaced by a 28:72 copolymer of vinyl acetate and ethylene, or by polyethylene glycol.

Example 4

A baryta paper was coated to an effective thickness with a solution of 0.1 g. of leuco crystal violet, 1.0 g. of m-nitro-$\omega,\omega,\omega$-tribromoacetophenone, and 1.0 g. of N-vinylcarbazole in 10 ml. of a 3% solution of polystyrene in acetone. When the procedure described in Example 3 was followed, a blue image on a colorless background was obtained.

Example 5

A baryta paper was coated to an effective thickness with a solution of 0.5 g. of poly-N-vinyl pyrrolidone, 1.0 g. of N-vinylcarbazole, 1.0 g. of tetrabromomethane, and 0.05 g. of leuco crystal violet in 10 ml. of acetone, and dried.

Exposure was effected with a 500-watt incandescent lamp at a distance of 35 cm. under an original. The exposure time was twenty seconds. The paper was then washed with water, so that the light sensitive layer was washed away in the nonimage areas. A permanent image of a strong blue color was obtained on a colorless background.

Example 5B

Equally good results were obtained when the leuco crystal violet was replaced by leuco malachite green and the material was exposed for sixty seconds at the same distance to a 160-watt mixed light lamp.

Example 5C

Results equally as good as those of Example 5B were obtained when the poly-N-vinyl pyrrolidone was replaced by polyvinyl alcohol.

Example 6

A baryta pape which had been precoated with a polyvinyl alcohol was coated with the solution as described in Example 5. A 1:10 re-enlargement was produced from a microfilm by means of a 500-watt slide projector. Exposure time was sixty seconds. The unexposed areas of the layer could vey easily be removed with water. Blue images on a colorless background were likewise obtained.

Example 6B

The same results were also obtained when the paper was used which had been precoated with a polyvinyl chloride dispersion.

Equally good results were obtained with an exposure time of thirty seconds and a coating composition of Example 5 wherein the tetrabromomethane was replaced by the following halogen compounds:

Example 6C 2,5-dimethyl-ω,ω,ω-tribromoacetophenone.

Example 6D m-nitro-ω,ω,ω-tribromoacetophenone.

Example 6E

Pentabromoethane.

Example 7

A polyester film which had been precoated with a layer of polyvinyl alcohol hardened by means of formaldehyde was coated as in Example 5, exposed, and washed with water. A film thus provided with an image was particularly suited to further copying on photocopying paper.

Example 8

A paper printing foil, that is a solvent-resistant, waterproof paper support having a hydrophilic surface, was coated as in Example 5, exposed, and washed with water. The areas bared by the washing repelled a greasy printing ink, whereas the image areas accepted the printing ink very well. A printing plate prepared in this manner could be used for printing in an offset machine.

Example 9

An eloxated aluminum support was whirl-coated to an effective thickness with a 3% solution in acetone of a reaction product of a phenol aldehyde resin and chloroacetic acid which had been prepared in accordance with German Pat. No. 1,053,930, and then dried. Subsequently, a solution of 1.0 g. of the above mentioned resin, 2.0 g. of N-vinyl carbazole, 2.0 g. of carbontetrabromide, and 25 mg. of leuco malachite green in 10 ml. of acetone was applied to en effective thickness by whirl-coating. The coated material was then exposed for thirty seconds under an original to the light of a carbon arc lamp at a distance of 100 cm. Fixing was effected with a wash with a 20% aqueous solution of sodium metasilicate. After complete washing the exposed areas accepted greasy ink so that the plate could be used for printing in an offset printing press.

Equally good results were obtained when the support used consisted of brushed aluminum.

Example 10

The procedure described in Example 9 was repeated, using a zinc plate as the support. After an exposure time of thirty seconds under an original, using a 500-watt mixed light lamp at a distance of 35 cm., the material was washed with a 20% solution of sodium metasilicate and then etched for ten minutes in a 10% nitric acid solution. In the bared areas corresponding to the unexposed areas of the plate the zinc was dissolved away, so that a negative relief image of the original was obtained.

Example 10B

Equally good results as in Example 10 were obtained when a magnesium plate was used as the support.

Example 11

The procedure described in Example 9 was repeated using, however, a copper-laminated plastic plate as the support. After an exposure of thirty seconds under a master, using a 500-watt mixed light lamp at a distance of 35 cm., the material was washed with a 20% solution of sodium metasilicate and the copper in the unexposed areas was etched away by means of a 28% solution of iron-III-chloride.

The above examples have been presented for the purpose of illustration and should not be taken to limit the scope of the present invention. It will be apparent that the described examples are capable of many variations and modifications. All such variations and modifications are to be included within the scope of the present invention as set forth in the appended claims.

What is claimed is:

1. Light-sensitive material comprising a suitable support and a light-sensitive coating thereon, said coating comprising the dried residue of a homogeneous solution in a suitable solvent, said residue comprising:
   (a) a leuco triaryl methane dye, selected from the group consisting of leuco crystal violet, leuco malachite green, fuchsine base, leuco pararosaniline;
   (b) an N-vinyl carbazole, selected from the group consisting of N-vinyl carbazole and its alkyl derivatives; and,
   (c) a halogen hydrocarbon which splits off halogen when exposed to light, said halogen hydrocarbon having the general formula:

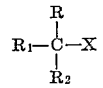

wherein X represents chlorine, bromine or iodine, and R, $R_1$ and $R_2$ are the same or are different and represent chlorine, bromine, iodine, hydrogen, alkyl, aryl, aralkyl, alkenyl or a heterocyclic group.

2. Light-sensitive material according to claim 1, wherein said composition includes a binder material selected from the group consisting of natural and synthetic resins.

3. Light-sensitive material according to claim 1, wherein said composition includes a binder material selected from the group consisting of natural and synthetic resins having substantial solubility in both an organic and an aqueous alkaline solution.

4. Light-sensitive material according to claim 1, wherein said halogen hydrocarbon is selected from the group consisting of: tetrabromomethane, 4-bromo-ω,ω,ω-tribromoacetophenone, 2,4 - dimethyl-ω,ω,ω-tribromoacetophenone, and 3-nitro-ω,ω,ω-tribromoacetophenone.

5. Light-sensitive material according to claim 1, wherein said composition comprises:
   (a) leuco crystal violet,
   (b) N-vinyl carbazole, and
   (c) tetrabromomethane.

6. The method of making a permanent photocopy which comprises:
   (a) image-wise exposing to light the light-sensitive material of claim 1, and
   (b) washing said material so exposed with a solvent for the dye and halogen hydrocarbon compounds.

7. The method according to claim 6 including an additional step of rinsing said material with an alkaline solution.

8. The method of making a printing plate material which comprises:
   (a) image-wise exposing to light the light-sensitive material of claim 3, and
   (b) washing said material so exposed with a solvent selected from the group consisting of water and aqueous alkaline solutions.

9. The method of image-wise etching a plate which comprises:
   (a) image-wise exposing to light the light-sensitive material of claim 3, wherein the support is a plate to be etched,
   (b) washing said material so exposed with a solvent selected from the group consisting of water and aqueous alkaline solutions, and (c) contacting the surface of said material so washed with an aqueous composition having an etching effect on said plate.

References Cited

UNITED STATES PATENTS

| | | | |
|---|---|---|---|
| 3,042,517 | 7/1962 | Walner | 96—90 |
| 3,046,209 | 7/1962 | Sprague | 96—90 |
| 3,102,810 | 9/1963 | Sprague et al. | 96—90 |
| 3,147,117 | 9/1964 | Walner et al. | 96—90 |

OTHER REFERENCES

Venkataraman, K.: The Chemistry of Synthetic Dyes, vol. II, 1952, pp. 707—708.

NORMAN G. TORCHIN, Primary Examiner

R. E. FICHTER, Assistant Examiner

U.S. Cl. X.R.

96—88, 90

Notice of Adverse Decision In Interference

In Interference No. 97,912 involving Patent No. 3,525,616, E. A. Hackmann and J. Munder, LIGHT SENSITIVE COMBINATION OF HALOGEN HYDROCARBON, A LEUCO TRIARYL METHANE DYE AND AN N-VINYLCARBAZOLE, final judgement adverse to the patentees was rendered Oct. 17, 1972, as to claims 1, 2, 3, 4 and 5.

[*Official Gazette December 12, 1972.*]